(12) United States Patent
Liu et al.

(10) Patent No.: US 12,075,084 B2
(45) Date of Patent: Aug. 27, 2024

(54) PARTIAL COST CALCULATION

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 121 days.

(21) Appl. No.: 17/494,508

(22) Filed: Oct. 5, 2021

(65) Prior Publication Data
US 2022/0030265 A1    Jan. 27, 2022

Related U.S. Application Data

(63) Continuation of application No. 16/993,677, filed on Aug. 14, 2020, now Pat. No. 11,159,816, which is a
(Continued)

(51) Int. Cl.
*H04N 19/513* (2014.01)
*H04N 19/119* (2014.01)
(Continued)

(52) U.S. Cl.
CPC ......... *H04N 19/513* (2014.11); *H04N 19/119* (2014.11); *H04N 19/184* (2014.11); *H04N 19/44* (2014.11); *H04N 19/543* (2014.11)

(58) Field of Classification Search
None
See application file for complete search history.

(56) References Cited

U.S. PATENT DOCUMENTS

| 5,661,524 A | 8/1997 | Murdock et al. |
| 5,987,180 A * | 11/1999 | Reitmeier ............ H04N 19/523 |
| | | 375/E7.218 |

(Continued)

FOREIGN PATENT DOCUMENTS

| CN | 101039419 A | 9/2007 |
| CN | 102710934 A | 10/2012 |

(Continued)

OTHER PUBLICATIONS

Examination Report under Section 18(3) from Patent Applicaton GB2018865.2 dated Feb. 28, 2022.
(Continued)

*Primary Examiner* — Peter D Le
(74) *Attorney, Agent, or Firm* — Perkins Coie LLP

(57) ABSTRACT

A method of decoding a bitstream comprising a digital representation of a video includes decoding motion information for a current video block from the bitstream, estimating matching costs of the current video block using one or more templates based on a partial set of pixel locations in each of the one or more templates, where in the each of the one or more templates includes a video block with multiple samples and refining the motion information of the current video block using a template having a minimum matching cost.

20 Claims, 18 Drawing Sheets

Related U.S. Application Data continuation of application No. PCT/IB2019/054710, filed on Jun. 6, 2019.

(60) Provisional application No. 62/682,150, filed on Jun. 7, 2018.

(51) Int. Cl.

| | |
|---|---|
| H04N 19/184 | (2014.01) |
| H04N 19/44 | (2014.01) |
| H04N 19/543 | (2014.01) |

(56) References Cited

U.S. PATENT DOCUMENTS

| | | | |
|---|---|---|---|
| 7,627,037 B2 | 12/2009 | Li et al. | |
| 8,228,990 B2 | 7/2012 | Msharam et al. | |
| 8,755,437 B2 | 6/2014 | Lin et al. | |
| 9,294,777 B2 | 3/2016 | Wang | |
| 9,497,481 B2 | 11/2016 | Kitahara et al. | |
| 9,521,425 B2 | 12/2016 | Chen et al. | |
| 9,667,996 B2 | 5/2017 | Chen et al. | |
| 9,762,927 B2 | 9/2017 | Chen et al. | |
| 10,523,964 B2* | 12/2019 | Chuang | H04N 19/20 |
| 10,764,592 B2 | 9/2020 | Zhang et al. | |
| 10,779,002 B2 | 9/2020 | Chen et al. | |
| 10,785,494 B2 | 9/2020 | Chien et al. | |
| 11,070,838 B2* | 7/2021 | Robert | H04N 19/513 |
| 11,159,816 B2 | 10/2021 | Liu et al. | |
| 11,363,290 B2 | 6/2022 | Liu et al. | |
| 11,722,688 B2 | 8/2023 | Liu et al. | |
| 2002/0025001 A1 | 2/2002 | Ismaeil et al. | |
| 2003/0138150 A1 | 7/2003 | Srinivasan | |
| 2004/0156435 A1 | 8/2004 | Toh et al. | |
| 2005/0013364 A1 | 1/2005 | Hsu et al. | |
| 2005/0053294 A1* | 3/2005 | Mukerjee | H04N 19/51 375/E7.125 |
| 2007/0286286 A1 | 12/2007 | Heng et al. | |
| 2008/0043831 A1 | 2/2008 | Sethuraman et al. | |
| 2008/0212676 A1 | 9/2008 | Liu et al. | |
| 2009/0161761 A1 | 6/2009 | Ramachandran et al. | |
| 2009/0232215 A1 | 9/2009 | Park et al. | |
| 2010/0309377 A1* | 12/2010 | Schoenblum | H04N 19/587 348/607 |
| 2010/0309979 A1 | 12/2010 | Schoenblum | |
| 2011/0103482 A1 | 5/2011 | Lee | |
| 2011/0176611 A1 | 7/2011 | Huang et al. | |
| 2012/0044998 A1 | 2/2012 | Kokaram et al. | |
| 2012/0128071 A1 | 5/2012 | Celetto et al. | |
| 2012/0140830 A1 | 6/2012 | Xu et al. | |
| 2012/0155540 A1 | 6/2012 | Jagannathan | |
| 2014/0146890 A1 | 5/2014 | Chiu et al. | |
| 2014/0226721 A1 | 8/2014 | Joshi et al. | |
| 2014/0286408 A1 | 9/2014 | Zhang et al. | |
| 2015/0181216 A1 | 6/2015 | Zhang et al. | |
| 2015/0195562 A1 | 7/2015 | Li et al. | |
| 2015/0264387 A1 | 9/2015 | Rapaka et al. | |
| 2016/0345011 A1 | 11/2016 | Naing et al. | |
| 2017/0332107 A1 | 11/2017 | Abbas et al. | |
| 2017/0347093 A1 | 11/2017 | Yu et al. | |
| 2017/0347102 A1 | 11/2017 | Panusopone et al. | |
| 2018/0098079 A1 | 4/2018 | Chuang et al. | |
| 2018/0184117 A1 | 6/2018 | Chen et al. | |
| 2018/0199057 A1* | 7/2018 | Chuang | H04N 19/573 |
| 2018/0241998 A1 | 8/2018 | Chen et al. | |
| 2018/0359483 A1 | 12/2018 | Chen et al. | |
| 2019/0110058 A1 | 4/2019 | Chien et al. | |
| 2019/0132606 A1 | 5/2019 | Su et al. | |
| 2019/0306502 A1 | 10/2019 | Gadde et al. | |
| 2019/0342557 A1 | 11/2019 | Robert et al. | |
| 2020/0128258 A1 | 4/2020 | Chen et al. | |
| 2020/0296414 A1 | 9/2020 | Park et al. | |
| 2020/0374543 A1 | 11/2020 | Liu et al. | |
| 2020/0374544 A1 | 11/2020 | Liu et al. | |
| 2020/0382795 A1 | 12/2020 | Zhang et al. | |
| 2020/0382807 A1 | 12/2020 | Liu et al. | |
| 2020/0396453 A1 | 12/2020 | Zhang et al. | |
| 2021/0029362 A1 | 1/2021 | Liu et al. | |
| 2021/0051339 A1 | 2/2021 | Liu et al. | |
| 2021/0076063 A1 | 3/2021 | Liu et al. | |
| 2021/0084322 A1 | 3/2021 | Chen et al. | |
| 2021/0092435 A1 | 3/2021 | Liu et al. | |
| 2021/0195227 A1* | 6/2021 | Lee | H04N 19/567 |
| 2022/0174309 A1 | 6/2022 | Liu et al. | |

FOREIGN PATENT DOCUMENTS

| | | |
|---|---|---|
| CN | 102970543 A | 3/2013 |
| CN | 104780383 A | 7/2015 |
| CN | 105120265 A | 12/2015 |
| CN | 106105196 A | 11/2016 |
| CN | 106165423 A | 11/2016 |
| CN | 107483960 A | 12/2017 |
| CN | 108028937 A | 5/2018 |
| EP | 3701718 A1 | 9/2020 |
| KR | 20160132863 A | 11/2016 |
| TW | 201813396 A | 4/2018 |
| WO | 2015048459 A1 | 4/2015 |
| WO | 2015142833 A1 | 9/2015 |
| WO | 2016160605 A1 | 10/2016 |
| WO | 2017197146 A1 | 11/2017 |
| WO | 2018002021 A1 | 1/2018 |
| WO | 2018121506 A1 | 7/2018 |
| WO | 2019001786 A1 | 1/2019 |
| WO | 2019231706 A1 | 12/2019 |

OTHER PUBLICATIONS

Chen et al. "EE3: Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting, Chengdu, CN, Oct. 2016, document JVET-E0052, 2016.

Chen et al. "Algorithm Description of Joint Exploration Test Model 5," Joint Video Exploration Team (JVET) of ITU-T SG 16 WP 3 and ISO/IEC JTC 1/SC 29/WG 11, 5th Meeting, Geneva, CH, Jan. 12-20, 2017, document JVET-E1001, 2017.

Chen et al. "Algorithm Description of Joint Exploration Test Model 7 (JEM7))," Joint Video Exploration Team (JVET) of ITU-T SG 16 WP 3 and ISO/IEC JTC 1/SC 29/WG 11, 7th Meeting, Torino, IT, Jul. 13-21, 2017, document JVET-G1001, 2017.

Chen et al. "Description of SDR, HDR and 360 degrees Video Coding Technology Personal by Huawei, GoPro, HiSilicon and Samsung," buJoint Video Exploration Team (JVET) of ITU-T SG WP 3 and ISO/IEC JTC 1/SC 29/WG 11, 10th Meeting: San Diego, Apr. 10-20, 2018, Document JVET-J0025, 2018.

Chen et al. "CE9.2.5/9.2.6: DMVR with Template-Free Bilateral Matching," Joint Video Experts Team (JVET) of ITU-T SG 16 WP 3 and ISO/IEC JTC 1/SC 29/WG 11, 11th Meeting, Ljubljana, SI, Jul. 2018, document JVET-K0359, 2018.

Chien, Wei-Jung, "Core Experiment 12: Adaptive Motion Vector Resolution," Joint Collaborative Team on Video Coding (JCT-VC) of ITU-T SG 16 WP3 and ISO/IEC JTC 1/SC29 WG 11, 3rd Meeting, Guangzhou, CN, Oct. 7-15, 2010, document JCTVC-C512 M18605, 2010.

Esenlik et al. "CE9: Report on the Results of Tests CE9.2.15 and CE9.2.16," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0163, 2018.

Hsu et al. "Description of SDR Video Coding Technology Proposal by MediaTek" Joint Video Experts Team (JVET) of ITU-T SG 16 WP 3 and ISO/IEC JTC 1/SC 29/WG 11, 10th Meeting, San Diego, Apr. 10-20, 2018, document JVET-J0018, 2018.

Kamp et al. "Decoder Side Motion Vector Derivation for Inter Frame Video Coding," 15th IEEE International Conference on Image Processing, San Diego, Oct. 12-15, 2008, pp. 1120-1123.

Kang et al. "Description of SDR Video Coding Technology Proposal by ETRI and Sejong University," Joint Video Experts Team

(56) References Cited

OTHER PUBLICATIONS (JVET) of ITU-T SG 16 WP 3 and ISO/IEC JTC 1/SC 29/WG 11, 10th Meeting, San Diego, Apr. 10-20, 2018, document JVET-J0013, 2018.
Liao et al. "Non-CE9: Simplification of DMVR and BDOF Combination," Joint Video Experts Team (JVET) of ITU-T SG 16 WP 3 and ISO/IEC JTC 1/SC 29/WG 11, 14th Meeting: Geneva, CH, Mar. 19-27, 2019, document JVET-N0484, 2019.
Liu et al. "CE-9 related: Simplification of Decoder Side Motion Vector Derivation," Joint Video Experts Team (JVET) of TU-T SG 16 WP3 and ISO/IEC JTC 1/SC 29/WG 11, 11th Meeting, Ljubljana, Sl, Jul. 2018, document JVET-K0105-v1.
Park et al. "CE9-Related: Restricted Template Matching Schemes to Mitigate Pipeline Delay," Joint Video Exploration Team (JVET) of ITU-T SG 16 WP 3 and ISO/IEC JTC 1/SC 29/WG 11, 11th Meeting, Ljubljana, SL, Jul. 10-20, 2018, document JVET-K0093, 2018.
Rapaka et al. "AhG8: On Fast Intersearch Method for Screen Content Coding," Joint Collaborative Team on Video Coding (JCT-VC) of ITU-T SG 16 WP3 and ISO/IEC JTC 1/SC 29/WG11, 17th meeting: Valencia, ES, Mar. 27, 2014 to Apr. 4, 2014, document JCTVC-Q0147, 2014.
Schuster et al. "An Optimal Quad-Tree-Based Motion Estimator," Visual Communications and Image Processing, Jan. 20, 2004, San Jose, Oct. 7, 1996, 2952:50-61, XP001130814.
Venugopal et al. "Intra Region-based Template Matching," Joint Video Exploration Team (JVET) of ITU-T SG 16 WP 3 and ISOr/IEC JTC 1/SC 29/WG 11, 10th Meeting, San Diego, Apr. 10-20, 2018, document JVET-J0039, 2018.
Wien et al. "TE1: Twth Partner Report on DMVD," Joint Collaborative Team on Video Coding (JCT-VC) of ITU-T SG 16 WP3 and ISO/IEC JTC1/SC29/WG11, 2nd Meeting, Geneva, CH, Jul. 21-28, 2010, document JCTVC-B030, 2010.
Xiu et al. "Description of SDR, HDR, and 360 Degrees Video Coding Technology Proposal by InterDigital Communications and Dolby Laboratories," Joint Video Experts Team (JVET) of ITU-T SG 16 WP 3 and ISO/IEC JTC 1/SC 29/WG 11, 10th Meeting: San Diego, Apr. 10-20, 2018, document JVET-J0015, 2018.
Xu et al. "On Latency Reduction for Template-based Inter Prediction," Joint Video Experts Team (JVET) if ITU-T SG 16 WP 3 and ISO/IEC JTC 1/SC 29/WG 11, 10th meeting, San Diego, Apr. 10-20, 2018, document JVET-J0045, 2018.
Yang et al. "Efficient Motion Vector Coding Algorithms Based on Adaptive Template Matching Techniques, " Video Coding Exports Group (VCEG) 39th Meeting Kyoto Japan, Jan. 17-22, 2010, document VCEG-AM16, 2010.
Zhu et al. "Non-CE8: Adaptive Fractional MVD Search in DMVR for SCC," Joint Video Experts Team (JVET) of ITU SG 16 WP 3 and ISO/IEC JTC 1/SC 29/WG 11, 14th Meeting, Geneva, CH, Mar. 19-27, 2019, document JVET-N0260, 2019.
"Report of the 117th Meeting," Motion Picture Expert Group or ISO/IEC JTC1/SC29/WG11, 117, MPEG Meeting; Jan. 16-20, 2017, Geneva, document N16569, 2017.
International Search Report and Written Opinion from PCT/IB2019/054706 dated Sep. 27, 2019, (17 pages).
International Search Report and Written Opinion from PCT/IB2019/054707 dated Sep. 26, 2019, (17 pages).
International Search Report and Written Opinion from PCT/IB2019/054709 dated Nov. 18, 2019, (18 pages).
International Search Report and Written Opinion from PCT/IB2019/054710 dated Nov. 18, 2019, (18 pages).
International Search Report and Written Opinion from PCT/IB2019/054711 dated Oct. 8, 2019, (17 pages).
International Search Report and Written Opinion from PCT/IB2019/054713 dated Sep. 26, 2019, (18 pages).
International Search Report and Written Opinion from PCT/IB2019/054715 dated Sep. 20, 2019, (18 pages).
International Search Report and Written Opinion from PCT/IB2019/55616 dated Oct. 9, 2019, (16 pages).
Non-Final Office Action from U.S. Appl. No. 16/993,638 dated Oct. 8, 2020.
Non-Final Office Action from U.S. Appl. No. 16/998,653 dated Dec. 1, 2020.
Final Office Action from U.S. Appl. No. 16/993,638 dated Feb. 24, 2021.
Non-Final Office Action from U.S. Appl. No. 16/993,677 dated Sep. 30, 2020.
Final Office Action from U.S. Appl. No. 16/993,677 dated Jan. 7, 2021.
Non-Final Office Action from U.S. Appl. No. 16/993,677 dated May 14, 2021.
Chen et al. "Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting, Chengdu, CN, Oct. 15-21, 2016, document JVET-D0029, 2016.
Xu et al. "CE9-Related: Memory Bandwidth Reduction for DMVR," Joint Video Experts Team (JVET) of ITU-T SG 16 WP 3 and ISO/IEC JTC 1/SC 29/WG 11, 11th Meeting, Ljubljana, Sl, Jul. 10-18, 2018, document JVET-K0288, 2018.
Notice of Allowance from U.S. Appl. No. 16/998,653 dated Feb. 8, 2022.
Communication Pursuant to Article 94(3) EPC from European Patent Application No. 19745283.2, mailed Mar. 6, 2024.
Extended European Search Report from European Patent Application No. 23210304.4 dated Mar. 11, 2024.
Non-Final Office Action from U.S. Appl. No. 18/342,514 dated Jan. 18, 2024.

* cited by examiner

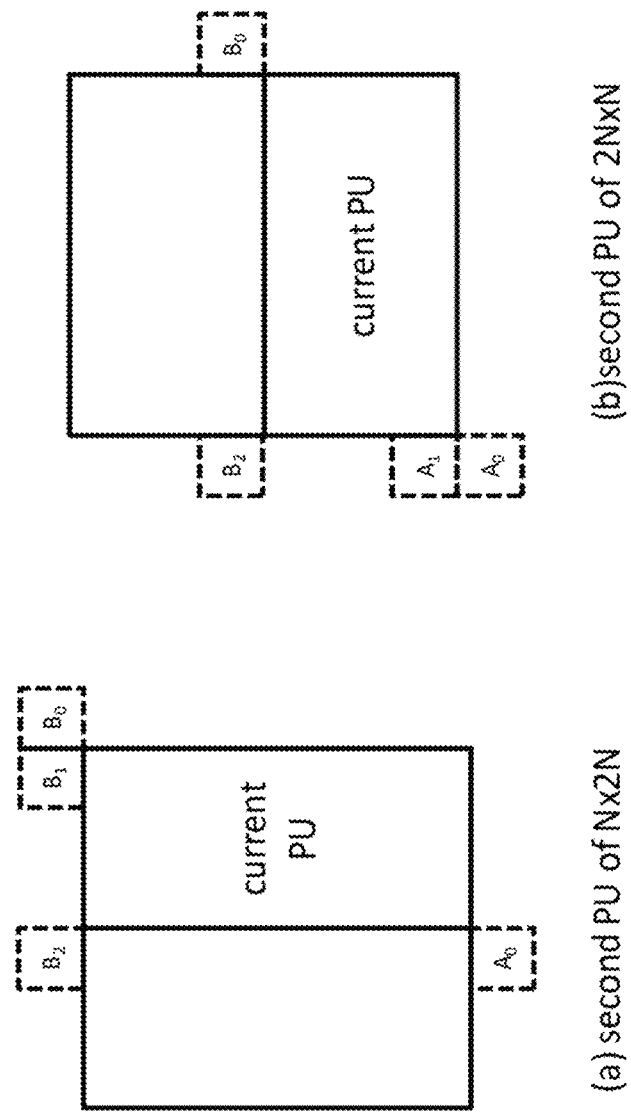

PARTIAL COST CALCULATION

CROSS-REFERENCE TO RELATED APPLICATIONS

This patent document is a continuation of and claims priority to U.S. application Ser. No. 16/993,677 filed on Aug. 14, 2020, which is a continuation of and claims priority to International Application No. PCT/IB2019/054710, filed on Jun. 6, 2019 which claims the priority to and benefits of prior U.S. Provisional Patent Application No. 62/682,150, filed on Jun. 7, 2018. The entire contents of the aforementioned patent applications are hereby incorporated by reference in their entireties.

TECHNICAL FIELD

This document is related to video coding technologies.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Techniques related to decoder side motion vector derivation (DMVD) in video coding are disclosed. It may be applied to the existing video coding standard like HEVC, or the standard (Versatile Video Coding) to be finalized. It may be also applicable to future video coding standards or video codec.

In one example aspect, a method of decoding a bitstream comprising a digital representation of a video is disclosed. The method includes decoding motion information for a current video block from the bitstream, estimating matching costs of the current video block using one or more templates based on a partial set of pixel locations in each of the one or more templates, where in the each of the one or more templates includes a video block with multiple samples, and refining the motion information of the current block using a template having a minimum matching cost.

In another example aspect, a method of decoding a bitstream comprising a digital representation of a video is disclosed. The method includes decoding motion information for a current video block from the bitstream, determining a size of the current video block, in accordance with a determination that the size of the current video block is less than a first size, estimating matching costs of the current video block using one or more templates based on a partial set of pixel locations in each of the one or more templates, where in the each of the one or more templates includes a video block with multiple samples, and in accordance with a determination that the size of the current video block is not less than a first size, estimating matching costs of the current video block using one or more templates based on all pixel locations in each of the one or more templates, where in the each of the one or more templates includes a video block with multiple samples, and refining the motion information of the current block using a template having a minimum matching cost.

In yet another example aspect, a method of decoding a bitstream comprising a digital representation of a video is disclosed. The method includes decoding motion information for a current video block from the bitstream, determining a size of the current video block, in accordance with a determination that the size of the current video block is greater than a first size, estimating matching costs of the current video block using one or more templates based on a partial set of pixel locations in each of the one or more templates, where in the each of the one or more templates includes a video block with multiple samples, and in accordance with a determination that the size of the current video block is not greater than a first size, estimating matching costs of the current video block using one or more templates based on all pixel locations in each of the one or more templates, where in the each of the one or more templates includes a video block with multiple samples, and refining the motion information of the current block using a template having a minimum matching cost.

In yet another example aspect, a method of decoding a bitstream comprising a digital representation of a video is disclosed. The method includes decoding motion information for a current video block from the bitstream, determining a shape of the current video block, in accordance with a determination that the shape of the current video block is a first shape, estimating matching costs of the current video block using one or more templates based on a partial set of pixel locations in each of the one or more templates, where in the each of the one or more templates includes a video block with multiple samples, in accordance with a determination that the shape of the current video block is a second shape, estimating matching costs of the current video block using one or more templates based on a partial set of pixel locations in each of the one or more templates, where in the each of the one or more templates includes a video block with multiple samples, and in accordance with the determination that the shape of the current block is a third shape, estimating matching costs of the current video block using one or more templates based on all pixel locations in each of the one or more templates, where in the each of the one or more templates includes a video block with multiple samples, and refining the motion information of the current block using a template having a minimum matching cost.

In another example aspect, an apparatus comprising a processor configured to implement each of the above-described methods is disclosed.

In yet another example aspect, these methods may be embodied in the form of computer-executable instructions and stored on a computer readable program medium.

These, and other, aspects are further described in the present document.

BRIEF DESCRIPTION OF THE DRAWINGS

FIG. 4A and FIG. 4B show example positions for the second PU of N×2N and 2N×N partitions.

DETAILED DESCRIPTION

Figure 1:
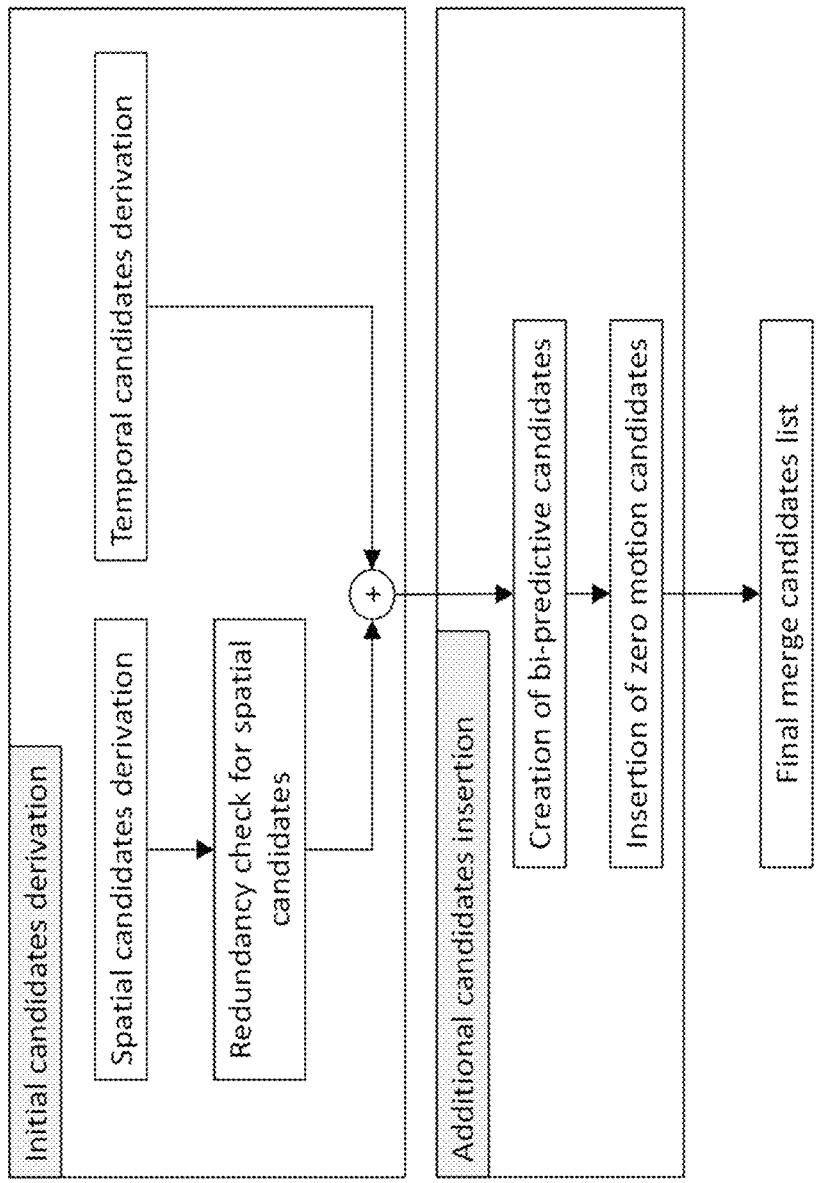
FIG. 1 shows an example of a derivation process for merge candidates list construction.

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Technical Framework

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/ HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2. Inter Prediction in HEVC/H.265

Each inter-predicted Prediction Unit (PU) has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors.

When a Coding Unit (CU) is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signaled explicitly per each PU. Such a mode is named Advanced Motion Vector Prediction (AMVP) in this document.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1. Merge Mode 2.1.1.1. Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
        Step 1.1: Spatial candidates derivation
        Step 1.2: Redundancy check for spatial candidates
        Step 1.3: Temporal candidates derivation
    Step 2: Additional candidates insertion
        Step 2.1: Creation of bi-predictive candidates
        Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.1.2. Spatial Candidate Derivation

Figure 3:
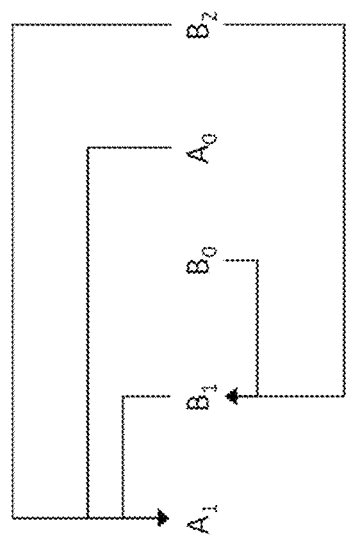
FIG. 3 shows examples of candidate pairs considered for redundancy check of spatial merge candidates.
Figure 2:
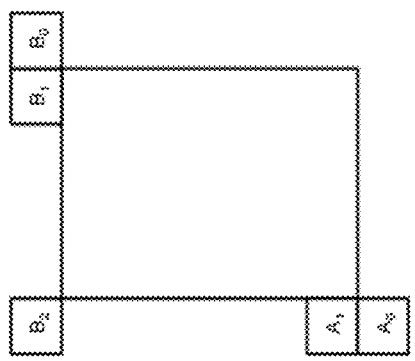
FIG. 2 shows example positions of spatial merge candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.1.3. Temporal Candidate Derivation

Figure 5:
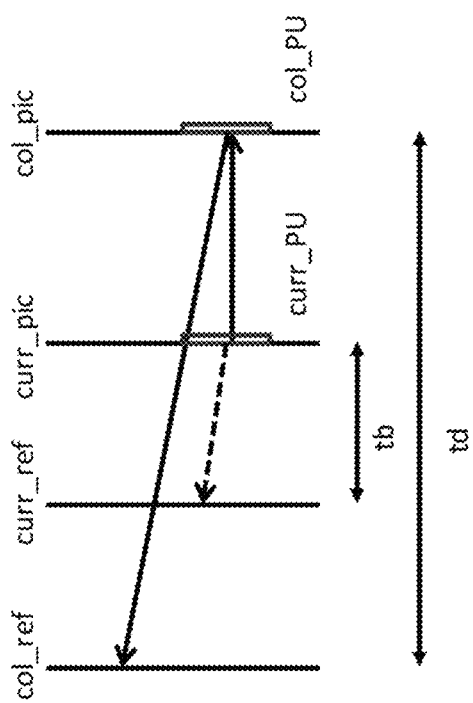
FIG. 5 is an example illustration of motion vector scaling for temporal merge candidate.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
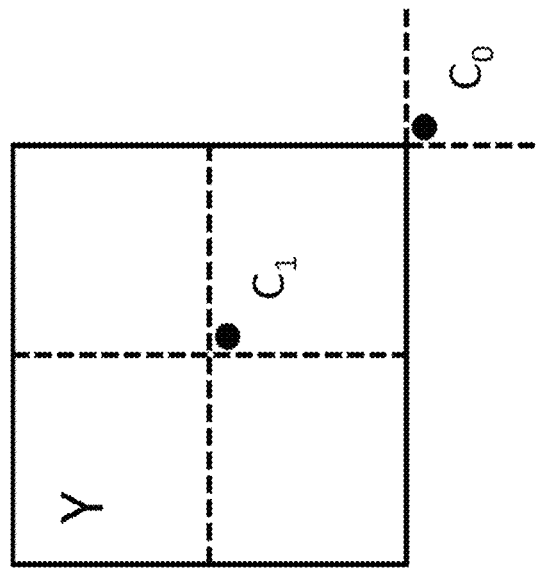
FIG. 6 shows examples of candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU row, position $C_1$ is used. Otherwise, position $C_0$ is used in the derivation of the temporal merge candidate.

2.1.1.4. Additional Candidate Insertion

Figure 7:
FIG. 7 shows an example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates, defined the HEVC specification.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.1.1.5. Motion Estimation Regions for Parallel Processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log2_parallel_merge_level_minus2" syntax element. When a MER is defined, merge candidates falling in the same region are marked as unavailable and therefore not considered in the list construction.

2.1.2. AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.2.1. Derivation of AMVP candidates

Figure 8:
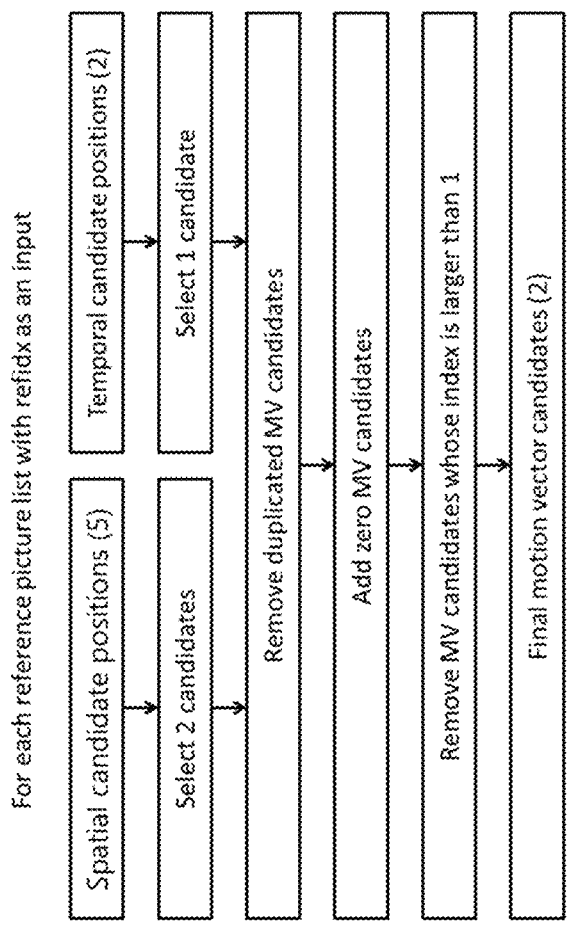
FIG. 8 shows an example derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.2.2. Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0, A_1$, and scaled $A_0$, scaled $A_1$. The order of derivation for the above side of the current PU is defined as $B_0, B_1, B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
(1) Same reference picture list, and same reference picture index (same POC)
(2) Different reference picture list, but same reference picture (same POC)

Spatial scaling
(3) Same reference picture list, but different reference picture (different POC)
(4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
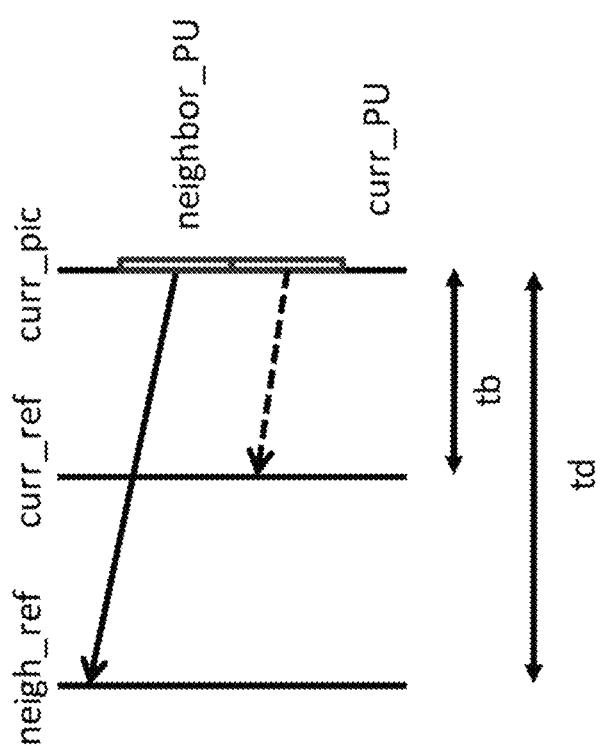
FIG. 9 shows an example illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.2.3. Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2. New Inter Prediction Methods in JEM 2.2.1. Pattern Matched Motion Vector Derivation Pattern matched motion vector derivation (PMMVD) mode is a special merge mode based on Frame-Rate Up Conversion (FRUC) techniques. With this mode, motion information of a block is not signalled but derived at decoder side.

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \quad (1)$$

Figure 10:
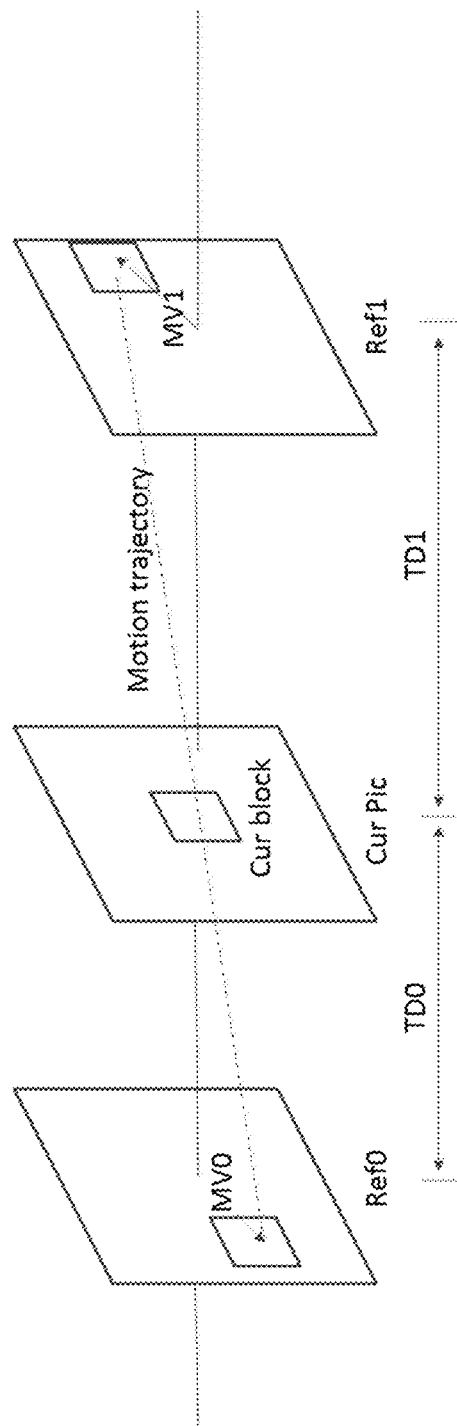
FIG. 10 shows an example of Bilateral matching.

As shown in the FIG. 10, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 11:
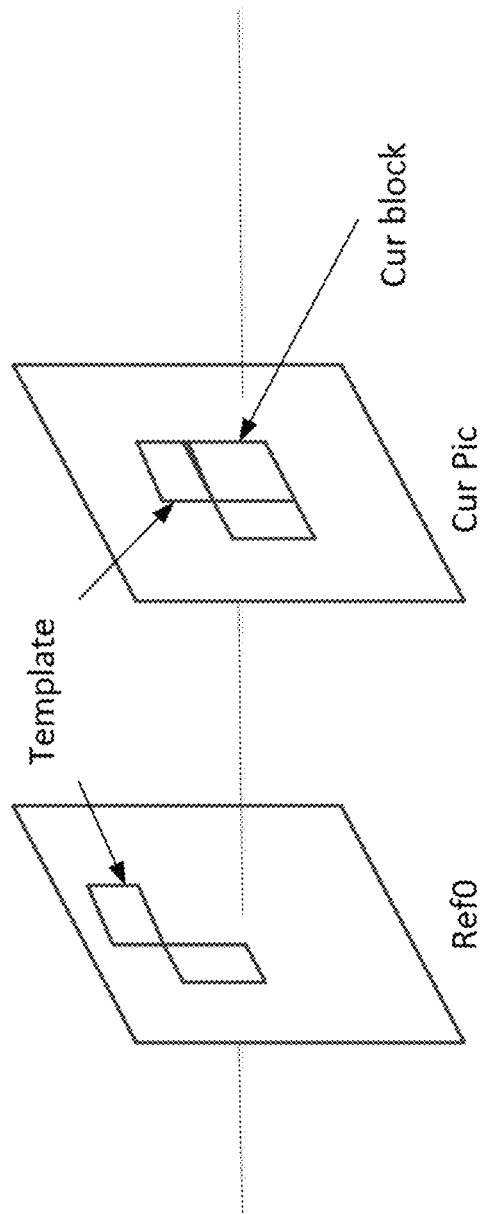
FIG. 11 shows an example of Template matching.
Figure 12:
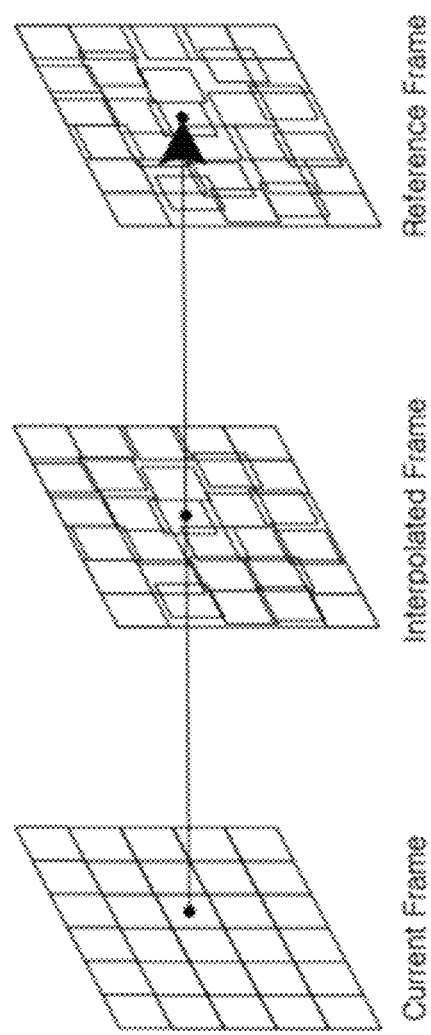
FIG. 12 shows an example of Unilateral ME in FRUC.

As shown in FIG. 11, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

2.2.2. CU Level MV Candidate Set

The MV candidate set at CU level consists of:
(i) Original AMVP candidates if the current CU is in AMVP mode
(ii) all merge candidates,
(iii) several MVs in the interpolated MV field, which is introduced in section 2.2.4.
(iv) top and left neighbouring motion vectors When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

2.2.3. Sub-CU Level MV Candidate Set

The MV candidate set at sub-CU level consists of:
(i) an MV determined from a CU-level search,
(ii) top, left, top-left and top-right neighbouring MVs,
(iii) scaled versions of collocated MVs from reference pictures,
(iv) up to 4 ATMVP candidates,
(v) up to 4 STMVP candidates The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

2.2.4. Generation of Interpolated MV Field

Before coding a frame, interpolated motion field is generated for the whole picture based on unilateral ME. Then the motion field may be used later as CU level or sub-CU level MV candidates.

Figure 13:
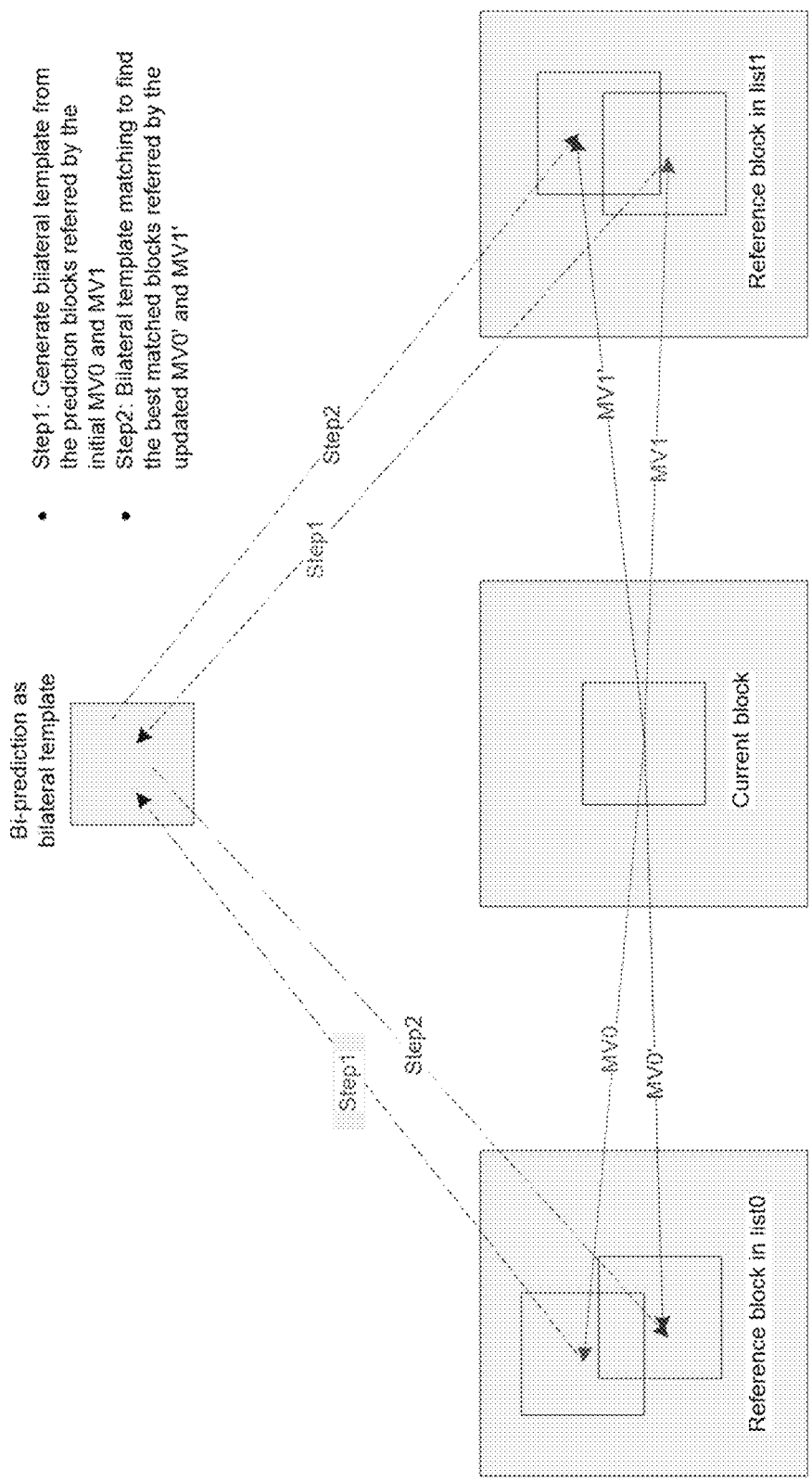
FIG. 13 shows an example of DMVR based on bilateral template matching.

First, the motion field of each reference pictures in both reference lists is traversed at 4×4 block level. For each 4×4 block, if the motion associated to the block passing through a 4×4 block in the current picture (as shown in FIG. 13) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

2.2.5. Interpolation and Matching Cost

When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad (2)$$

where w is a weighting factor which is empirically set to 4, MV and $MV^s$ indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

2.2.6. MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

2.2.7. Selection of Prediction Direction in Template Matching FRUC Merge Mode

In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

If costBi<=factor*min (cost0, cost1)
    bi-prediction is used;
Otherwise, if cost0<=cost1
    uni-prediction from list0 is used;
Otherwise,
    uni-prediction from list1 is used;

where cost0 is the SAD of list0 template matching, cost1 is the SAD of list1 template matching and costBi is the SAD of bi-prediction template matching. The value of factor is equal to 1.25, which means that the selection process is biased toward bi-prediction.

The inter prediction direction selection is only applied to the CU-level template matching process.

2.2.8. Decoder-Side Motion Vector Refinement

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

In DMVR, a bilateral template is generated as the weighted combination (i.e. average) of the two prediction blocks, from the initial MV0 of list0 and MV1 of list1, respectively, as shown in FIG. 13. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 13, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

2.2.9. Examples of Problems

DMVD methods like DMVR and FRUC perform motion estimation to derive or refine the motion information, which is very complex for the decoder. During motion estimation, they share one common problem: difference (absolute difference, square difference etc.) between template and candidate block is calculated for all pixels in the block and added up, and is then used to select the best matching block. This is not necessary because difference of partial pixels may be good enough for selecting the best candidate block or MV. Meanwhile, usually only luma component is used in derivation or refinement of motion vectors, and chroma components are not considered.

For DMVR, it has another complexity issue: it performs motion compensation twice, one for generating the template, and one for generating the final prediction block. As a result, for each reference picture list (i.e., prediction direction), it performs both horizontal interpolation and vertical interpolation twice, in case that the initial MV and the refined MV only have fractional components. This increases the worst-case complexity dramatically. Meanwhile, DMVR only works in merge mode and cannot work in AMVP mode. In MV refinement, it takes signaled MV (derived MV from a merge candidate) as the starting MV, and checks its surrounding MVs. However, MV precision of the signaled MV is not considered. In AMVR, low precision MV maybe selected. For example, suppose the highest allowable MV precision is ¼ pel, in AMVR, a 4 pel or 1 pel MV may be used. In this case, DMVR can be used to refine the MV precision. Unlike FRUC which can be applied at sub-block level, DMVR is performed at block level except for the ATMVP and STMVP case, which may lead to coding performance loss.

For FURC, when performing the bilateral matching, it considers the MV difference between the starting MV and the candidate MV to suppress unreliable motion vectors, as in Eq. 4. The MV difference is multiplied by a fixed weighting factor, which may be unreasonable. For larger blocks, the SAD plays a dominant role and the MV difference is neglectable, and for smaller blocks, the MV difference may be too large.

2.2.10. Example Embodiments

We propose several aspects to reduce the complexity and improve the coding performance of DMVD methods. The disclosed methods could be applied to existing DMVD methods, but also to future methods for motion/mode derivation at decoder side.

First, the cost (e.g., difference, distortion or the cost considering both distortion and MV) between template and a candidate block is calculated only for partial pixels in the decoder side motion estimation, i.e., in motion information derivation or refinement procedure. Second, for DMVR, the interpolation times is reduced. Third, some embodiments that use the disclosed techniques apply DMVR to AMVP mode. Fourth, weighting factor of MV difference can be different for different block sizes.

The following listing of examples provides some ways by which the disclosed techniques can be embodied into a video decoding process.

Denote prec as the motion vector precision, when prec is equal to N, it means the motion vector is with $\frac{1}{2}^N$ pel precision. N can be positive integers, zero, or negative integers.

Figure 14:
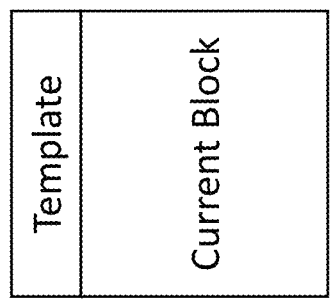
FIG. 14 shows an example of a simplified template in template matching.

1. The cost (e.g., difference) between the template and candidate blocks is calculated only for partially selected rows in motion information derivation or refinement procedure.
    a. In one example, selected rows are defined as all of the $i^{th}$ rows of every N rows, where N>1 and $1<=i<=N$. For example, N is equal to 2 and i is equal to 1.
    b. In one example, for each group with N rows, certain rows within the group are used as the selected rows. For example, the first row and the second row of every 4 rows are utilized.
    c. In one example, cost is calculated for arbitrarily selected rows of the block, e.g., the first row and the last row, or the first two rows and last two rows.
    d. Same rule can be applied to all block sizes when selecting partial rows. Alternatively, different rules can be applied to different block sizes and/or block shapes (e.g., square or rectangular or ratios between block width and block height).
        i. In one example, during the cost calculation, more rows are skipped for larger block size and vice versa. E.g., difference is calculated for the first row of every 2 rows when the block size is smaller than 16×16 (i.e., width*height<16*16), but is calculated for the first row of every 4 rows for other block sizes.
        ii. In one example, during the cost calculation, more rows are skipped for block shapes with larger height and vice versa. E.g., cost is calculated for the first row of every 2 rows when height of the block is smaller than 16, but is calculated for the first row of every 4 rows for other block sizes.
        iii. In one example, such simplification is only applied to one or several smallest block sizes (i.e., smallest width*height) to suppress the worst-case complexity. For example, the simplification is only applied to blocks with areas smaller than 8×8.
        iv. In one example, such simplification is only applied to one or several largest block sizes. For example, the simplification is only applied to blocks with areas larger than 32×32.
        v. In one example, such simplification is only applied to one or several block shapes with largest block heights or width.
        vi. In one example, such simplification is only applied some selected block shapes.
2. For each row of a block or each selected row of a block, cost is calculated for all columns or only partial columns.
    a. In one example, the cost is calculated for M continuous columns (can started at any valid column Y) of every T columns, where T>0, $1<=M<=T$, $1<=Y<=T-M+1$. For example, T=8, M=4 and Y=1.
    b. In one example, the cost is calculated for M selected columns of every T columns.

c. In one example, the cost is calculated for M arbitrarily selected columns of the row (e.g., the first K columns and the last L columns).
d. Same rule can be applied to all block sizes when selecting partial columns. Alternatively, different rules can be applied to different block sizes and/or block shapes (e.g., square or rectangular or ratios between block width and block height).
  i. In one example, during the cost calculation, more columns are skipped for larger block size and vice versa. E.g., difference is calculated for the first 4 columns of every 8 columns when the block size is smaller than 16×16, but is calculated for the first 4 columns of every 16 columns for other block sizes. When the column is smaller than 8 or 16, only the first 4 columns are used to calculated difference.
  ii. In one example, during the cost calculation, more columns are skipped for block shape with larger width and vice versa. E.g., cost is calculated for the first 4 columns of every 8 columns when width of the block is smaller than 16, but is calculated for the first 4 columns of every 16 columns for other block sizes.
  iii. In one example, such simplification is only applied to one or several smallest block sizes to suppress the worst-case complexity.
  iv. In one example, such simplification is only applied to one or several largest block sizes.
  v. In one example, such simplification is only applied to one or several block shapes with largest block widths.
  vi. In one example, such simplification is only applied some selected block shapes.
3. In DMVR, when generating the template, motion compensation is performed using integer MV or MV with integer horizonal component or vertical component instead of using the real MV as in JEM.
  a. In one example, MV (both horizontal component and vertical component) is rounded to integer precision for both prediction directions.
  b. In one example, MV of one prediction direction is rounded to integer precision, and MV of the other prediction direction is not changed.
  c. In one example, only one MV component (either horizonal component or vertical component) is rounded to integer precision for each prediction direction.
  d. In one example, MV of one prediction direction is rounded to integer precision, and only one MV component of the other prediction direction is rounded to integer precision.
  e. In one example, MV of one prediction direction is not changed, and only one MV component of the other prediction direction is rounded to integer precision.
  f. Denote fmv as the fractional mv, and denote imv as the rounded integer precision mv. Denote sign(x) as the sign of x, and sign $$\text{sign}(x) = \begin{cases} 1 & \text{if } x \geq 0 \\ -1 & \text{if } x < 0 \end{cases}.$$

i. imv=(fmv+(1<<(prec−1)))>>prec
  ii. Alternatively, imv=fmv>>prec
  iii. Alternatively, imv=(fmv+sign(fmv)*(1<<(prec−1)))>>prec
  g. Such simplification may be applied to all block sizes or only one or several block sizes and/or certain block shapes.
    i. In one example, it is applied to one or several smallest block sizes, like 4×4 in JEM or BMS (benchmark set), or 4×8 and 8×4 in HEVC.
    ii. In one example, it is applied to the one or several largest block sizes.
    iii. In one example, it is applied to some selected block sizes.
4. Alternatively, in DMVR, when generating the template, shorter tap of interpolation filter (such as bi-linear filter) is used in the motion compensation.
5. It is proposed that DMVR is performed in sub-block level. A block can be split into sub-blocks in different ways.
  a. In one example, all blocks are split into fixed M×N sub-block size, e.g., 4×4, or 4×8 or 8×4 or 8×8 or 8×16 or 16×8 or 16×16 etc. When the block width/height is integral multiple of the sub-block width/height, it is split into sub-blocks; otherwise, it is not split into sub-blocks.
  b. In one example, a block is split into K sub-blocks with equal size, wherein K>=2. For example, a M×N block is split into 4 (M/2)×(N/2) sub-blocks, or 2 (M/2)×N sub-blocks, or 2 M×(N/2) blocks.
  c. In one example, the split method depends on block sizes or block shapes or other coded information. For example, an 8×32 block is split into 4×8 sub-blocks and a 32×8 block is split into 8×4 sub-blocks.
  d. In one example, when generating a template of a sub-block, the derived motion information of the whole block may be utilized as in current block-level DMVR.
    i. Alternatively, the refined motion information of neighboring sub-block(s) with or without the derived motion information of the whole block may be utilized to form the template.
  e. In one example, the searching point of a sub-block may also consider the refined motion information from other sub-block(s).
6. In one example, the template used by template matching (in PMMVD) only includes pixels above the current block, excluding the pixels left to the current block, as shown in FIG. 14.
7. In existing DMVD methods, only luma component is considered to derive or refine the motion vectors. It is proposed to further consider the chroma components. Denote the costs of three color components of a given motion vector by Ci (wherein i indicates the color component index).
  a. The final cost is defined as Wi*Ci wherein Wi indicates the weights for the i-th color component.
  b. Alternatively, the final cost is defined as (W0*C0+W1*(C1+C2)). In some examples, either W0 or W1 is equal to 1.
  c. In one example, when applying DMVR to the chroma components, rounding of motion vectors may be applied so that integer motion vectors may be utilized and there is no need to apply interpolation for chroma components.
  d. In one example, when applying DMVR to the chroma components, if interpolation is required, shorter tap of interpolation filter (such as bi-linear filter) may be applied.

8. The above methods may be applied to certain color component, or all color components.
   a. Different rules may be applied to different color components, or luma and chroma components may utilize different rules.
   b. Alternatively, how and whether to apply the above methods may be further signaled in sequence parameter set, picture parameter set, slice header, etc.

Figure 15:
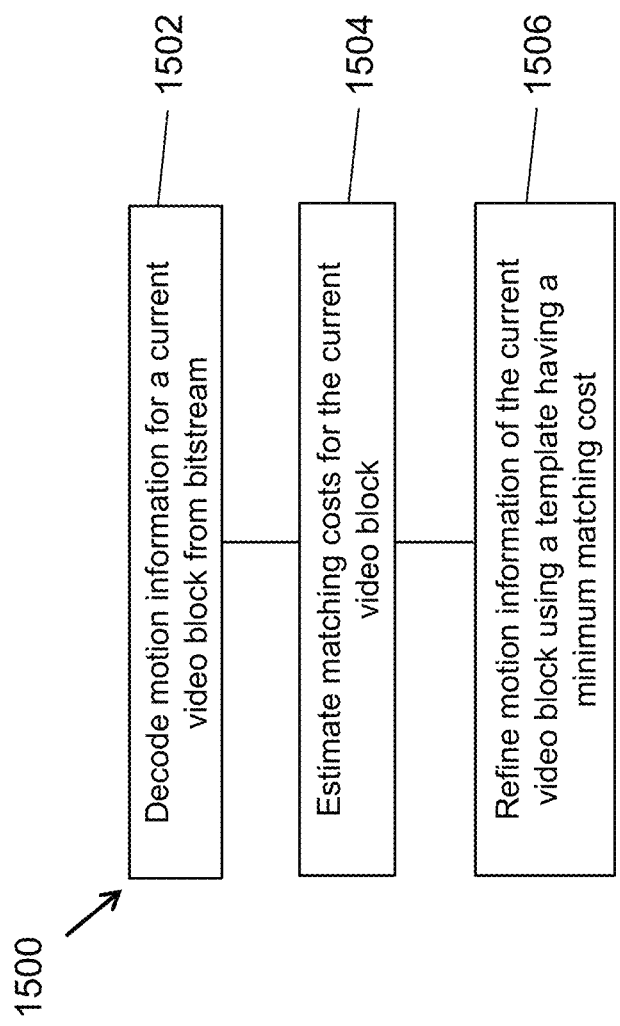
FIG. 15 is a flowchart for an example method of video decoding.

FIG. 15 is a flowchart for an example method 1500 of video decoding. The method 1500 includes decoding (1502) motion information for a current video block from the bitstream, estimating (1504) matching costs of the current video block using one or more templates based on a partial set of pixel locations in each of the one or more templates, where in the each of the one or more templates includes a video block with multiple samples, and refining (1506) the motion information of the current video block using a template having a minimum matching cost.

Figure 16:
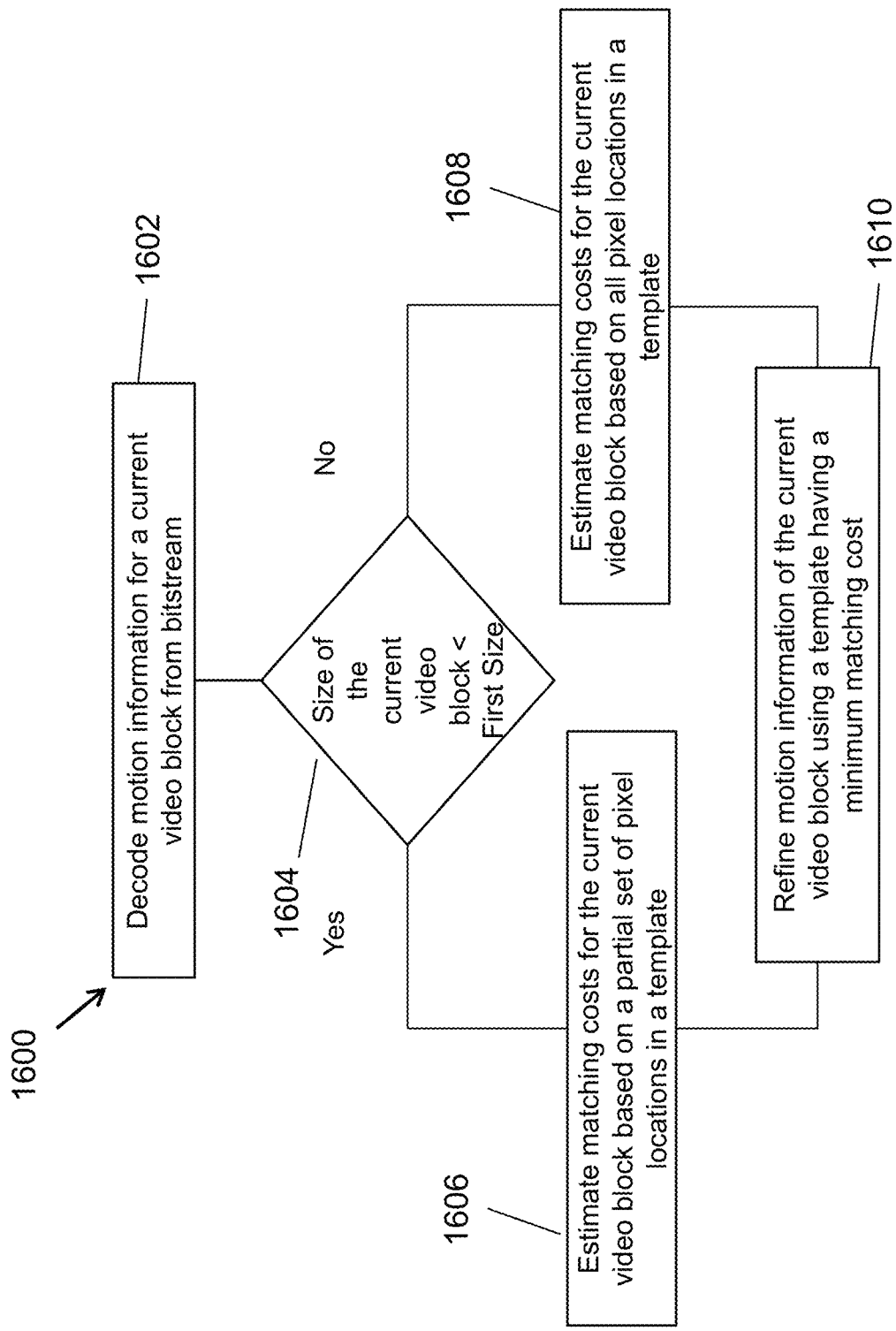
FIG. 16 is a flowchart for another example method of video decoding.

FIG. 16 is a flowchart for an example method 1600 of video decoding. The method 1600 includes decoding (1602) motion information for a current video block from the bitstream, determining (1604) whether the size of the current video block is less than a first size, estimating (1606) matching costs of the current video block using one or more templates based on a partial set of pixel locations in each of the one or more templates, where in the each of the one or more templates includes a video block with multiple samples, if the size of the current video block is less than a first size, estimating (1608) matching costs of the current video block using one or more templates based on all pixel locations in each of the one or more templates, where in the each of the one or more templates includes a video block with multiple samples, if the size of the current video block is not less than a first size, and refining (1610) the motion information of the current video block using a template having a minimum matching cost.

Figure 17:
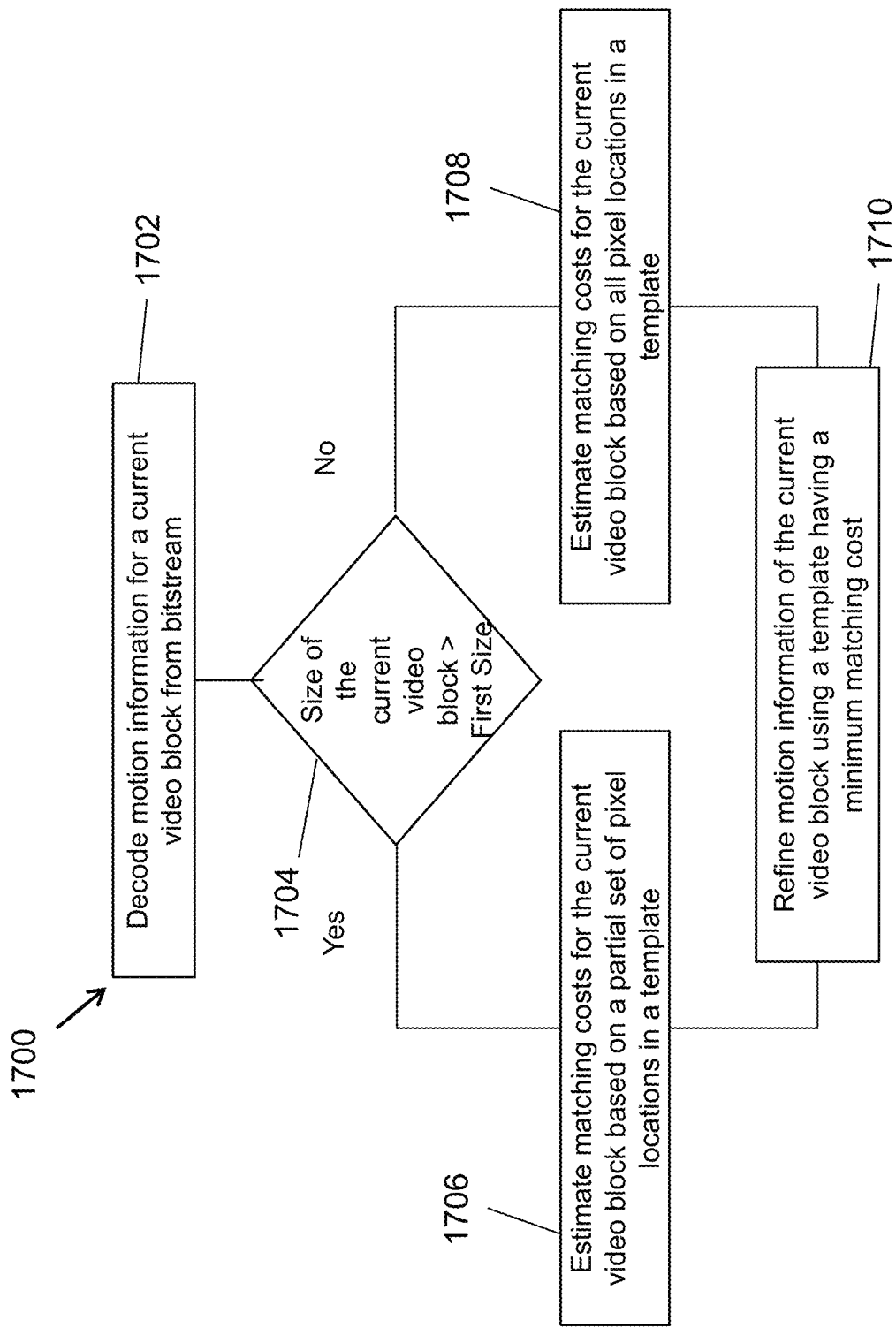
FIG. 17 is a flowchart for yet another example method of video decoding.

FIG. 17 is a flowchart for an example method 1700 of video decoding. The method 1700 includes decoding (1702) motion information for a current video block from the bitstream, determining (1704) whether the size of the current video block is greater than a first size, estimating (1706) matching costs of the current video block using one or more templates based on a partial set of pixel locations in each of the one or more templates, where in the each of the one or more templates includes a video block with multiple samples, if the size of the current video block is greater than a first size, estimating (1708) matching costs of the current video block using one or more templates based on all pixel locations in each of the one or more templates, where in the each of the one or more templates includes a video block with multiple samples, if the size of the current video block is not greater than a first size, and refining (1710) the motion information of the current video block using a template having a minimum matching cost.

Figure 18:
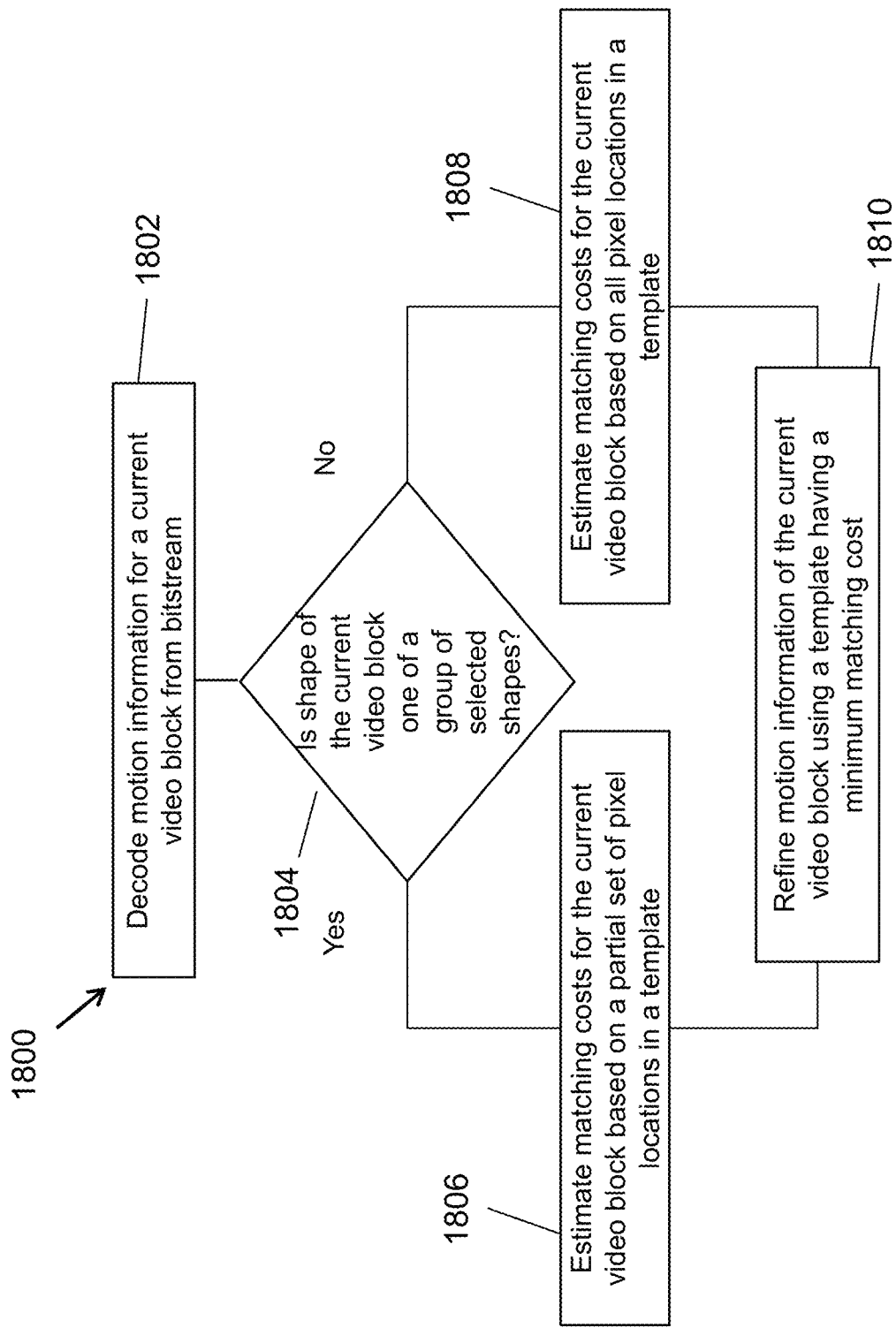
FIG. 18 is a flowchart for yet another example method of video decoding.

FIG. 18 is a flowchart for an example method 1800 of video decoding. The method 2800 includes decoding (1802) motion information for a current video block from the bitstream, determining (1804) whether the shape of the current video block is one of a group of selected shapes, estimating (1806) matching costs of the current video block using one or more templates based on a partial set of pixel locations in each of the one or more templates, where in the each of the one or more templates includes a video block with multiple samples, if the shape of the current video block is one of a group of selected shapes, estimating (1808) matching costs of the current video block using one or more templates based on all pixel locations in each of the one or more templates, where in the each of the one or more templates includes a video block with multiple samples, if the shape of the current video block is not one of a group of selected shapes, and refining (1810) the motion information of the current video block using a template having a minimum matching cost.

With respect to the above methods, in some embodiments, the partial set of pixel locations includes a subset of rows of the each of the one or more templates. In some embodiments, the partial set of pixel locations includes every $i^{th}$ row from every group of N rows of the each of the one or more templates.

Section 2.2.10 provide additional example embodiments and variations that can be implemented by methods 1500, 1600, 1700 or 1800.

Figure 19:
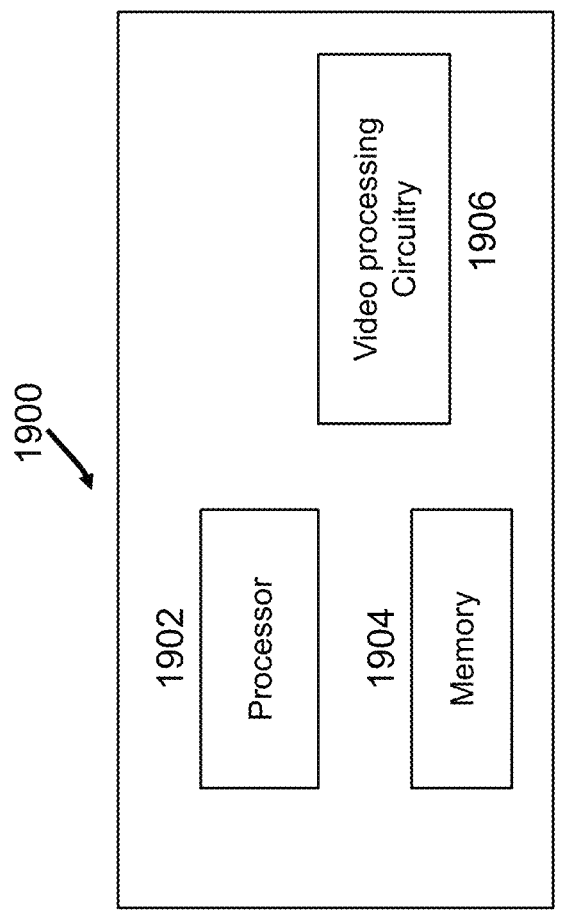
FIG. 19 is a block diagram of a video decoding apparatus.

FIG. 19 shows a block diagram of an example embodiment of a hardware device 1900 that can be utilized to implement various portions of the presently disclosed technology. The hardware device 1900 can be a laptop, a smartphone, a tablet, a camcorder, or other types of devices that are capable of processing videos. The device 1900 includes a processor or controller 1902 to process data, and memory 1904 in communication with the processor 1902 to store and/or buffer data. For example, the processor 1902 can include a central processing unit (CPU) or a microcontroller unit (MCU). In some implementations, the processor 1902 can include a field-programmable gate-array (FPGA). In some implementations, the device 1900 includes or is in communication with a graphics processing unit (GPU), video processing unit (VPU) and/or wireless communications unit for various visual and/or communications data processing functions of the smartphone device. For example, the memory 1904 can include and store processor-executable code, which when executed by the processor 1902, configures the device 1900 to perform various operations, e.g., such as receiving information, commands, and/or data, processing information and data, and transmitting or providing processed information/data to another device, such as an actuator or external display. To support various functions of the device 1900, the memory 1904 can store information and data, such as instructions, software, values, images, and other data processed or referenced by the processor 1902. For example, various types of Random Access Memory (RAM) devices, Read Only Memory (ROM) devices, Flash Memory devices, and other suitable storage media can be used to implement storage functions of the memory 1904. The device 1900 may further include dedicated video processing circuitry 1906 for performing repetitive computational functions such as transforms and decoding. The device 1900 may be used to implement methods 1500, 1600, 1700 or 1800.

Figure 20:
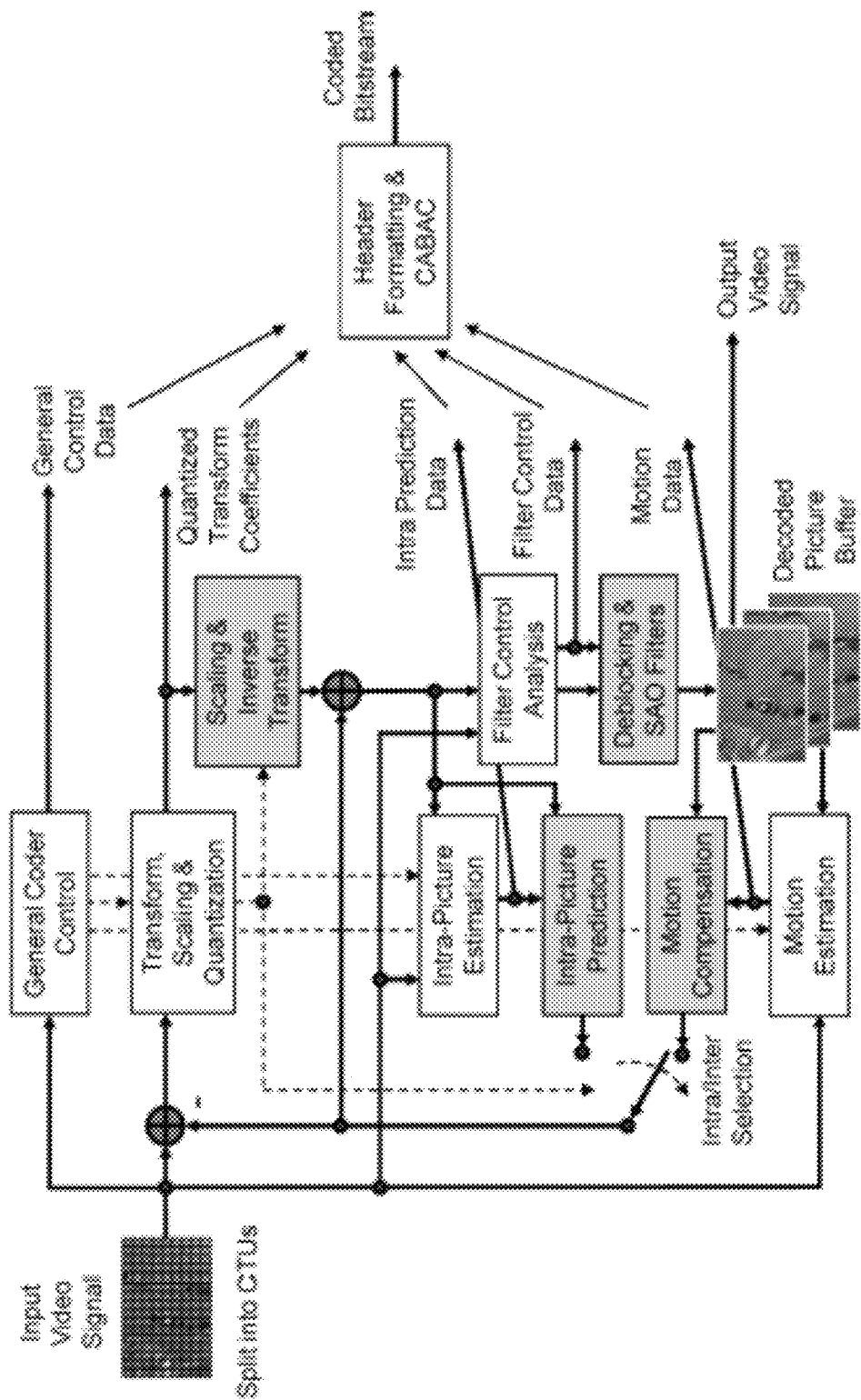
FIG. 20 shows an example implementation of a video encoder.

FIG. 20 is a block diagram showing an example implementation of a video encoder. The video encoder operates on video pictures that are coded using coding tools such as transform, motion estimation and coding of residual errors. Encoded video frames are reconstructed (motion compensated) at the encoder and used as reference pictures for inter coding of other video pictures. The techniques described in the present document may be implemented by the video encoder, or a video decoder, using a hardware platform such as described with respect to FIG. 19.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of coding video data, comprising:
deriving motion information for a current video block;
dividing, based on a size of the current video block, the current video block into one or multiple sub-blocks;
calculating a motion offset for each sub-block of the one or multiple sub-blocks by using only luma component of each sub-block;
deriving, based on the motion offset and a signaled luma motion vector, a first refined motion information for luma component of each sub-block of the one or multiple sub-blocks and a second refined motion information for chroma component of each sub-block of the one or multiple sub-blocks using a decoder motion vector refinement (DMVR) tool; and
performing a conversion between the current video block and a bitstream using the first refined motion information and the second refined motion information,
wherein deriving the first refined motion information or the second refined motion information for each sub-block further comprises:
determining, based on the motion information of the current video block, at least one region in a reference picture for the each sub-block;
using one row of every N rows in each of the at least one region to calculate at least one matching cost;
determining the first refined motion information or the second refined motion information for the each sub-block based on the at least one matching cost.

2. The method of claim 1, wherein dividing comprises:
dividing the current video block into the multiple sub-blocks in height to make a height of a sub-block being equal to a predefined height, if a height of the current video block is an integral multiple of the predefined height; and
dividing the current video block into the multiple sub-blocks in width to make a width of the sub-block being equal to a predefined width, if a width of the current video block is an integral multiple of the predefined width.

3. The method of claim 2, wherein at least one of the predefined height and the predefined width is 16.

4. The method of claim 1, wherein a width of a sub-block is less than or equal to 16 and a height of the sub-block is less than or equal to 16.

5. The method of claim 1, wherein the multiple sub-blocks have a same size.

6. The method of claim 1, wherein the one row is a first row of the every N rows.

7. The method of claim 1, wherein N is equal to 2.

8. The method of claim 1, wherein the conversion comprises decoding the current video block from the bitstream.

9. The method of claim 1, wherein the conversion comprises encoding the current video block into the bitstream.

10. An apparatus for coding video data comprising a processor and a non-transitory memory with instructions thereon, wherein the instructions upon execution by the processor, cause the processor to:
derive motion information for a current video block;
divide, based on a size of the current video block, the current video block into one or multiple sub-blocks;
calculate a motion offset for each sub-block of the one or multiple sub-blocks by using only luma component of each sub-block;
derive, based on the motion offset and a signaled luma motion vector, a first refined motion information for luma component of each sub-block of the one or multiple sub-blocks and a second refined motion information for chroma component of each sub-block of the one or multiple sub-blocks using a decoder motion vector refinement (DMVR) tool; and
performing a conversion between the current video block and a bitstream using the first refined motion information and the second refined motion information,
wherein the instructions upon execution by the processor further cause the processor to:
determine, based on the motion information of the current video block, at least one region in a reference picture for the each sub-block;
use one row of every N rows in each of the at least one region to calculate at least one matching cost;
determine the first refined motion information or the second refined motion information for the each sub-block based on the at least one matching cost.

11. The apparatus of claim 10, wherein the instructions upon execution by the processor, cause the processor to:
divide the current video block into the multiple sub-blocks in height to make a height of a sub-block being equal to a predefined height, if a height of the current video block is an integral multiple of the predefined height; and
divide the current video block into the multiple sub-blocks in width to make a width of the sub-block being equal to a predefined width, if a width of the current video block is an integral multiple of the predefined width.

12. The apparatus of claim 11, wherein at least one of the predefined height and the predefined width is 16.

13. The apparatus of claim 10, wherein a width of a sub-block is less than or equal to 16 and a height of the sub-block is less than or equal to 16.

14. The apparatus of claim 10, wherein N is an integer and is equal to or larger than 2.

15. The apparatus of claim 10, wherein the one row is a first row of every N rows.

16. A non-transitory computer-readable storage medium storing instructions that cause a processor to:
derive motion information for a current video block;
divide, based on a size of the current video block, the current video block into one or multiple sub-blocks;
calculate a motion offset for each sub-block of the one or multiple sub-blocks by using only luma component of each sub-block;
derive, based on the motion offset and a signaled luma motion vector, a first refined motion information for luma component of each sub-block of the one or multiple sub-blocks and a second refined motion information for chroma component of each sub-block of the one or multiple sub-blocks using a decoder motion vector refinement (DMVR) tool; and
performing a conversion between the current video block and a bitstream using the first refined motion information and the second refined motion information,
wherein the instructions further cause the processor to:
determine, based on the motion information of the current video block, at least one region in a reference picture for the each sub-block;
use one row of every N rows in each of the at least one region to calculate at least one matching cost;
determine the first refined motion information or the second refined motion information for the each sub-block based on the at least one matching cost.

17. The non-transitory computer-readable storage medium of claim 16, wherein a width of a sub-block is less than or equal to 16 and a height of the sub-block is less than or equal to 16.

18. The non-transitory computer-readable storage medium of claim 16, the instructions upon execution by the processor, cause the processor to:
divide the current video block into the multiple sub-blocks in height to make a height of a sub-block being equal to a predefined height, if a height of the current video block is an integral multiple of the predefined height; and
divide the current video block into the multiple sub-blocks in width to make a width of the sub-block being equal to a predefined width, if a width of the current video block is an integral multiple of the predefined width.

19. The non-transitory computer-readable storage medium of claim 18, wherein at least one of the predefined height and the predefined width is 16.

20. A method for storing a bitstream of a video, comprising:
deriving motion information for a current video block;
dividing, based on a size of the current video block, the current video block into one or multiple sub-blocks;
calculating a motion offset for each sub-block of the one or multiple sub-blocks by using only luma component of each sub-block;
deriving, based on the motion offset and a signaled luma motion vector, a first refined motion information for luma component of each sub-block of the one or multiple sub-blocks and a second refined motion information for chroma component of each sub-block of the one or multiple sub-blocks using a decoder motion vector refinement (DMVR) tool;

generating the bitstream using the first refined motion information and the second refined motion information; and storing the bitstream in a non-transitory computer-readable recording medium, wherein deriving the first refined motion information or the second refined motion information for each sub-block further comprises:

determining, based on the motion information of the current video block, at least one region in a reference picture for the each sub-block;

using one row of every N rows in each of the at least one region to calculate at least one matching cost;

determining the first refined motion information or the second refined motion information for the each sub-block based on the at least one matching cost.

* * * * *